A. VIEHMEYER.
COOKING UTENSIL.

No. 170,921. Patented Dec. 7, 1875.

ATTEST:

INVENTOR:

UNITED STATES PATENT OFFICE.

AUGUST VIEHMEYER, OF ST. LOUIS, MISSOURI.

IMPROVEMENT IN COOKING-UTENSILS.

Specification forming part of Letters Patent No. 170,921, dated December 7, 1875; application filed October 15, 1875.

*To all whom it may concern:*

Be it known that I, AUGUST VIEHMEYER, of the city and county of St. Louis and State of Missouri, have invented a new and useful Improvement in Coooking-Utensils, which improvement is fully set forth in the following specification, reference being had to the accompanying drawings.

My improvement consists in a cooking-vessel within an outer vessel that contains the water. The outer vessel is enlarged at top, forming a steam-space extending over and around the top of the cooking-vessel, and the steam enters this space through a number of holes in the upper edge of the cylindrical part of the water-vessel. These holes are above the lower part of the said steam-space, so that an annular channel is formed for the reception of condensed water that drains into the water-vessel through pipes extending down below the water-level. The steam-openings of the upper part of the water-vessel are partly closed, when desired, by a valve-ring, which has large and small perforations, either series of which may be brought in conjunction with the steam-orifices to regulate the freedom of the steam-escape from the water-vessel, and, consequently modify the heat of the water to some extent. This valve-ring slips circumferentially on the top part of the water-vessel, to regulate the size of the steam-orifices, as described.

Figure 1:
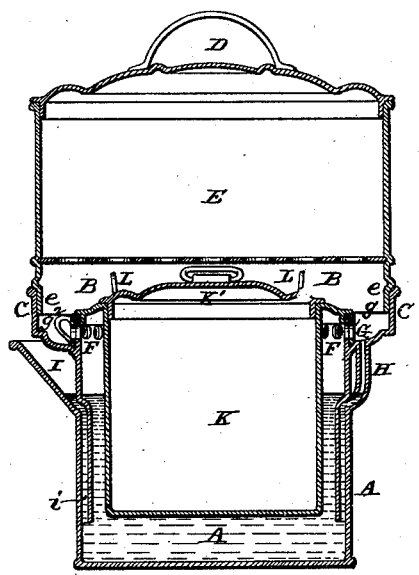
Figure 2:
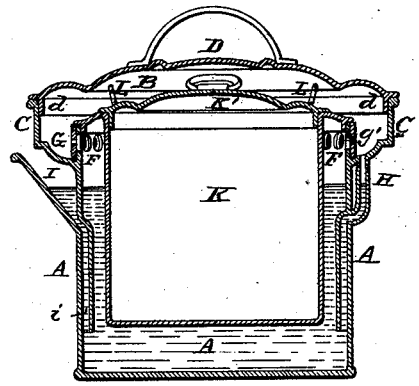
Figure 3:
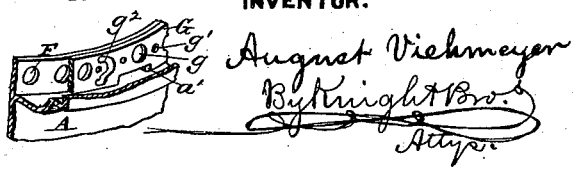

In the drawings, Figure 1 is an axial section with steamer attached. Fig. 2 is a similar section without the steamer. Fig. 3 is a detached view of part of the upper portion of the water-vessel.

A is the cylindrical part of the outer or water vessel. Surrounding the upper part of this is a steam-chamber, B, whose wall C incloses tightly the flange $d$ of the lid D, or the flange $e$ of the ordinary steamer E. F, F, and $c$ are a number of steam-orifices in the upper part of the vessel A, communicating with the steam-space B. Surrounding the perforated part of the vessel A is a valve-ring, G, having series of orifices $g$ and $g^1$, either series of which may, by turning the ring, be brought in conjunction with the series of holes F. Thus, when the large orifices $g$ are used for the passage of steam it has free passage, but when the small orifices $g^1$ are used, the escape of steam from the water-vessel is checked, and the water consequently attains a slightly higher temperature. The ring G is moved by a thumb-piece, $g^2$, and its movement limited by a pin, $a'$. At the lower part of the steam-chamber B are one or more drain-pipes, H, extending from the bottom of said chamber, and discharging near the bottom of the vessel A, so as to prevent the escape of steam through the pipe H. I is a spout in the side of A, just beneath the steam-chamber B, through which water is poured into the vessel A. This spout communicates with the lower part of the vessel A, through a pipe, $i$, whose lower end should be continually covered with water, so as to prevent the escape of steam, except when the water has fallen to too low a level, so as to expose the lower end of the pipe, and in this case the escape of steam will indicate an insufficiency of water, and more water may be poured in. K' is the lid of the cooking-vessel K, and L L rings by which it may be lifted from the vessel A.

I claim as my invention—

1. The water-vessel A, having top steam-chamber B, and orifices F, regulated by valve-ring G, in combination with the cooking-vessel K, having lid K', substantially as set forth.

2. The combination, with the cooking-vessel K K', of the water-vessel A, having drain-pipes H, for conveying the condensed steam, and the supply I, for conveying the cold water to a point near the bottom or heated part of the vessel A, substantially as shown and described.

AUGUST VIEHMEYER.

Witnesses:
ROBERT BURNS,
SAML. KNIGHT.